US005834668A

United States Patent [19]

Kumano et al.

[11] Patent Number: 5,834,668

[45] Date of Patent: Nov. 10, 1998

[54] KEYBOARDING APPARATUS FOR ELECTRONIC MUSICAL INSTRUMENT WITH SIMPLIFIED MASS MEMBER AND METHOD OF MAKING MASS MEMBER

[75] Inventors: Shinji Kumano; Tsuyoshi Sato, both of Hamamatsu, Japan

[73] Assignee: Yamaha Corporation, Hamamatsu, Japan

[21] Appl. No.: 667,017

[22] Filed: Jun. 19, 1996

[30] Foreign Application Priority Data

Jun. 20, 1995 [JP] Japan .................................... 7-152839

[51] Int. Cl.[6] ........................................................ G01C 3/12

[52] U.S. Cl. ............................ 84/423 R; 84/434; 84/440

[58] Field of Search ................................ 84/423 R, 439, 84/440, 433, 434

[56] References Cited

U.S. PATENT DOCUMENTS 4,901,613 2/1990 Kumano et al. .......................... 84/719

4,901,614 2/1990 Kumano et al. .......................... 84/719

*Primary Examiner*—William M. Shoop, Jr.

*Assistant Examiner*—Shih-yung Hsieh

*Attorney, Agent, or Firm*—Pillsbury Madison & Sutro LLP

[57] ABSTRACT

A keyboard apparatus having keys and mass members that are relatively light in weight and low in cost and yet provide a good key touch feeling that is comparable to the key touch feeling of a keyboard apparatus of an acoustic grand piano. A keyboard apparatus for an electronic musical instrument includes a support member including a first fulcrum section and a second fulcrum section. A key is movably supported about the first fulcrum section of the support member, and a mass member is movably supported on the support member and coupled to the key. The mass member has a mass concentration section made of an elongated metal bar and a resin section connected to the mass concentration section. The resin section has a pivotal fulcrum receiving section to be pivotally supported about the second fulcrum of the support member.

38 Claims, 4 Drawing Sheets

KEYBOARDING APPARATUS FOR ELECTRONIC MUSICAL INSTRUMENT WITH SIMPLIFIED MASS MEMBER AND METHOD OF MAKING MASS MEMBER

BACKGROUND OF THE INVENTION

1. Field of the Invention

Embodiments of the present invention relate to a keyboard apparatus of an electronic musical instrument, and more particularly to mass members for a keyboard apparatus and a method of making the mass members.

2. Description of Related Art

A typical keyboard apparatus for an electronic musical instrument has keys and mass members (or hammers) coupled to the associated keys. Each of the mass members is driven by each of the associated keys upon depression of the key. As one of its functions, the mass member is provided to generate a relatively heavy key touch feeling that is similar to a key touch feeling provided by a natural musical instrument, such as an acoustic grand piano (see, for example, U.S. Pat. No. 4,901,614). When a key is depressed with a certain key depression force, an associated mass member moves in association with the depression of the key, and provides a force corresponding to the movement of the mass member as a counter force against the key depression force. As a result, the desired key depression touch feeling is generated upon depression of the key.

In typical conventional keyboard apparatuses, each of the mass members is mounted under each of the associated keys and mainly formed from a metal material. As a result of installing the mass member under the associated key, a variety of restrictions are imposed in designing the mass members. For example, a variety of components have to be disposed under each of the keys. The components include a key guide, a key switch, a force transmission section that moves in association with the movement of a key and transmits a force between the key and the corresponding mass member, upper and lower stoppers for stopping the mass member and the key, return springs for returning the key and the mass member to their respective home positions, and the like. Because of the presence of these components, freedom in designing the mass members is substantially restricted. For example, freedom in designing the shape of the mass member, the mass member stroke and the weight of the mass member is substantially limited. In particular, while it is desirous for a mass member to be able to move across a relatively long stroke in association with the movement of a corresponding key, the desired stroke cannot be provided due to the design limitations described above.

It is noted that a keyboard apparatus should be made from ideal structural components to be an attractive, marketable product. In addition, user-friendly elements should be considered to make a keyboard apparatus even more appealing to customers. The user-friendly elements include a variety of elements that define a good product that sells well. For example, the term "user-friendly elements" is represented by a keyboard apparatus that is light in weight, thin, safe, strong, durable (small secular change), easy to assemble, and provides a pleasant key touch feeling. The more user-friendly elements a keyboard apparatus has, the more attractive the keyboard apparatus becomes as a consumer product, and possibly, the more the keyboard apparatus sells.

Let us consider these elements with respect to typical conventional keyboard apparatuses. First, because of the various restrictions described above, the force transmission section is disposed about the center of the key, resulting in a relatively small range of movement (or a relatively short stroke) of the force transmission section. As a result, the movement of the mass member is also restricted to a relatively narrow range of stroke compared with the total range of stroke of the key. On the other hand, if the mass member were provided with a full range of stroke corresponding to the total range of key stroke, the keyboard apparatus would become substantially thicker in height. Furthermore, since the stroke of the force transmission section is relatively short, a high driving accuracy for the key and the mass member is required and thus the overall cost of the keyboard apparatus is increased. Because the mass member stroke is short, a relatively heavy hammer is used to provide an appropriate key touch feeling that is similar to the key touch feeling provided by a keyboard apparatus of an acoustic grand piano. To provide sufficient structural strength to the heavy mass member, and considering the structural limitations of the mass member, a main portion of the mass member is formed from a relatively heavy metal material and generally in the shape of a letter S, as shown in FIG. 5. For making such a mass member, a punching process, a cutting process or a press process is generally used. FIG. 5 shows a conventional punch process in which mass members 200 are punched out by a punch 202 from a sheet of metal 204. The punching process and the cutting process particularly generate burrs in a punched or a cut metal piece, and therefore post-processes such as grinding work and polishing work are required to remove the burrs.

In typical conventional keyboard apparatuses, the movement of the mass member is stopped by a stopper that is typically made of a felt material. In order for the stopper to repeatedly and securely receive the moment of inertia of the mass member for a long time, and in order to prevent the stopper from breaking as a result of the repeated impacts by the mass member, a resin must be outserted on the mass member even when the post-processes are performed. The above-described post-processes may be performed to provide the mass member with a relatively large and round surface area that abuts against the felt stopper. In such a case, the resin outsert may not be required. However, an extra cost for the post-processes results, and the entire cost of a keyboard apparatus product incorporating such a mass member substantially increases. Moreover, although the felt stopper may retain its good shape for a while after the purchase of the keyboard apparatus, the felt would lose its resilience after the key has been depressed tens of thousands of times.

The components described above (particularly those provided at the side of the mass member) are indispensable no matter what shape the mass member is formed. To maintain the integrity of the components for a relatively long time in a typical conventional keyboard apparatus, the force transmission section and a switch actuator section, requiring a high precision, are formed from a polyacetal resin by a resin outserting process, and the tip portion of the mass member is formed from a soft vinyl chloride resin by a resin outserting process. Namely, two different resins are used even though the outsert process becomes more complicated.

In order to simplify the above-described process, the outsert process is performed only with the polyacetal resin even though the polyacetal resin is more expensive than the vinyl chloride resin. In this case, a difference in thermal stress between the metal member and the resin is generated due to the difference in thermal expansion coefficient between the metal and the resin when the outsert process is performed. The difference in thermal stress is generated not only during the manufacturing stage but also in other circumstances. For example, a musical instrument having a keyboard apparatus may be transported from one country to another country in a jet plane flying, for example over Alaska, in the stratosphere in which the ambient temperature is extremely low. As soon as the musical instrument arrives in the foreign country, the musical instrument may be performed on a brilliantly illuminated stage in a heated concert hall. In such a case, a thermal stress difference generated by an extreme temperature difference is substantially large. Also, there is a difference in capability of absorbing stresses between the metal material and the resin that are generated when the keys are stricken. Due to the thermal stress difference and the difference in the stress absorption capability, cracks are generated in the resin parts at joints between the resin and the metal. The cracks eventually cause the mass member to clatter, vibrate and generate noises as the performance of the musical instrument is repeated over a long period of time. In particular, cracks are likely generated in the resin parts on the mass member where burrs on the mass member are covered by the resin.

Let us now consider the key touch feeling generated upon depression of a key. In general, a heavy mass member provides a heavy key touch feeling. However, a satisfactory key touch feeling, that is comparable with the key touch feeling provided by a keyboard apparatus of an acoustic grand piano, cannot be obtained by merely adding weight to the mass member. Other features must also be considered to create a satisfactory key touch feeling.

For example, consideration should also be given to the dynamics of the key and the mass member, including the mass member upon releasing a key after depression of the key. When a key is released after depression of the key, the key returns to its home position by one or a combination of forces acting upon the key that may be generated by, for example, return springs coupled to the key or the mass member, the weight of the mass member, and the like. For example, to improve the operation of returning a key to the home position of the key, the counter force that acts upon the player's finger may be increased. However, this method has a conflicting drawback in that the key is very heavy upon depression of the key. In order to reduce an initial counter force that acts upon the player's finger upon depression of a key, a see-saw key mechanism may be used. A typical see-saw key mechanism has a mass member having a front section and a rear section. The mass member is pivotable in association with the movement of the key about a fulcrum provided between the front section and the rear section of the mass member. According to the typical see-saw key mechanism, the counter force of the key that acts upon the player's finger gradually increases upon depression of the key. However, the use of the see-saw key mechanism alone generally slows the releasing of the key. In order to provide a pleasing, satisfactory key touch feeling for both the key release operation and the key depression operation that is comparable with the key touch feeling of a keyboard apparatus of an acoustic grand piano, an additional complex mass member structure must be added to the see-saw key mechanism.

Moreover, in typical conventional keyboard apparatuses (described, for example in U.S. Pat. No. 4,901,614), in order to facilitate assembly of keys and mass members onto a support member of the keyboard apparatus, the keys and the corresponding mass members are coupled by one-way force transmission couplings. More specifically, the force transmission couplings are designed so that the keys only push the corresponding mass members when the keys are depressed so that key depression forces are transferred from the keys to the mass members. On the other hand, the keys are not connected to the mass members and are free with respect to the mass members when the keys are released after depression of the keys. In this case, when the key is rapidly depressed with an excessive force, the mass member may be decoupled from the key and move independently of the key. The mass member then abuts against and rebounds on the corresponding stopper and hits the key. This movement of the mass member generates (unpleasant feeling) vibrations which are transmitted through the key to the player's finger.

SUMMARY OF THE INVENTION

It is an object of embodiments of the present invention to provide a keyboard apparatus having keys and mass members that are relatively light in weight in which each of the mass members has an improved mass member stroke with respect to a key stroke of each of the corresponding keys, and in which unpleasant vibrations of the keys are substantially eliminated.

It is another object of embodiments of the present invention to provide a keyboard apparatus having an improved key touch feeling and an improved key stop feeling that are comparable with the key touch feeling and the key stop feeling provided by a keyboard apparatus of an acoustic grand piano. In accordance with an embodiment of the present invention, keyboard scaling is readily performed for each of the keys or each group of the keys. For example, keyboard scaling is performed to provide different parameters for each of the keys or each group of the keys. As a result, the key touch feeling is readily changed or adjusted for each of the keys or each group of the keys.

It is an object of the present invention to solve the problems associated with the generation of burrs in metal members used for mass members and to simplify the metal process for making the metal members for the mass members.

Furthermore, it is an object of the present invention to provide a mass member formed from a resin material and a metal material to be assembled in a keyboard apparatus with a reduced cost in which a reliable bonding between the metal material and the resin material is provided.

In accordance with an embodiment of the present invention, a keyboard apparatus for an electronic musical instrument includes a novel mass member. The mass member includes a mass concentration section that is made of an elongated metal bar and a non-metal section connected to the mass concentration section. The non-metal section is preferably made from one of appropriate moldable materials, such as a resin. As a result, the material cost for the mass member is substantially lowered, and thus the entire cost for the keyboard apparatus is lowered. For example, in a conventional manufacturing method, mass concentration sections of mass members are punched out from a metal plate, as shown in FIG. 5. After the mass concentration sections are punched out from the metal plate, the remaining portions of the metal plate are normally discarded as scraps. The amount of the remaining portions of the metal plate amount to about 70% of the entire volume of the metal plate. In other words, the yield, that is defined by a ratio of the effectively used material and the wasted material, is 30%. Assuming that the weight of a mass member is 50 g, the cost of a steel plate is about 100 Japanese yen (about 1 US$)/Kg, and the yield is 30%, the material cost for each mass concentration section is 0.05 Kg÷0.3×100 yen/Kg=17 yen.

In contrast, in accordance with an embodiment, a metal bar is cut into pieces, each having a predetermined length and used as a mass concentration section for a mass member, as shown in FIG. 6 (A). Accordingly, when the same steel material is used to make a mass concentration section having the same weight as a punched out mass concentration section described above, the yield amounts to 100%. Therefore, the material cost for each mass concentration section is 0.05 Kg÷1.0×100 yen/Kg=5 yen. Moreover, when a tip portion of a cut metal bar is bent to define a weight concentration section in order to provide the same key weight feeling that may be provided by the conventional punched out mass member, the overall weight of a mass concentration section can be reduced to 25 g. Therefore, the material cost in this case is reduced to 2.5 yen. This means that the annual production of about 10 million pieces results in a reduction of 140–150 million yen (1.4–1.5 million U.S. dollars) in the material cost.

In accordance with an embodiment of the present invention, a mass member is partially formed from a non-metal moldable material, such as a resin. A mass member typically includes various sections that are difficult to form by a metal material because of their relatively complicated configuration. These sections include but are not limited to, for example, a fulcrum receiving section of the mass member, a compression spring retaining section that applies a force to the fulcrum section, a force transmission section, a switch actuator section, a guide section for mounting a key to the mass member, and a retaining section for preventing the mass member from coming off a support member after mounting the mass member to the support member. In an embodiment, the sections described above may be integrally formed in the resin section of a mass member. By forming these sections having complicated configurations with a resin, the manufacturing work is substantially facilitated.

In one embodiment of the present invention, a mass member has a resin section and an elongated metal bar section connected to the metal bar section. The resin section has a fulcrum receiving section about which the entire mass member is rotated. Since the specific gravity of the metal is generally greater than that of the resin, the center of gravity of the mass member shifts toward a free end of the mass member at the side of the metal section. Assuming that the embodiment mass member and a conventional mass member that is entirely made of a metal material have substantially the same overall weight, the center of gravity of the embodiment mass member substantially shifts closer to the free end portion of the mass member, and the rotational moment about the fulcrum receiving section increases. In other words, with substantially the same rotational moment, the farther the center of gravity of a mass member from the fulcrum receiving section of the mass member (or the longer the arm of the mass member extending from the fulcrum receiving section), the lighter the mass member. As a consequence, the weight of a mass member, and therefore the weight of a keyboard apparatus can be substantially reduced.

In accordance with another embodiment of the present invention, the metal section of the mass member is formed by a metal rolling process or a metal drawing process. As a result, sections that generate burrs are substantially reduced, and the post-process to remove burrs can be eliminated. Furthermore, areas in the metal section that generate burrs, if any, are substantially limited to substantially small areas at the ends of the metal section. In one embodiment of the present invention, one end of the metal section may be embedded in the resin section for connecting the metal section to the resin section. Therefore, if burrs were generated at the end section of the metal section that is covered by the resin, and if cracks were generated in the resin due to the burrs, the generation of the cracks would be limited to that small end section of the metal bar, and cracks would not be generated in other major portions of the resin section. As a result, the mass member has an improved overall mechanical strength which substantially prevents generation of clatters between the metal section and the resin section and thus generation of noises.

In accordance with another embodiment of the present invention, the resin section is outserted over the metal section. As a result, the resin section and the metal section are securely connected with a simpler process. Alternatively, the resin section and the metal section are joined by pressure connecting, or by gluing. As a result, the resin section and the metal section are securely and readily joined.

In accordance with an embodiment of the present invention, a portion of the metal section is deformed. One end of the metal section that is connected to the resin section is deformed in order to substantially eliminate burrs at that end of the metal section. As a result, bonding at a connecting section between the resin section and the metal section is substantially improved and cracks in the resin at the connecting section are substantially reduced or eliminated. In another embodiment, the other end of the metal section has a stopper abutting section that abuts against a stopper, for example, a felt stopper or the like, so that the rotational movement of the mass member is stopped by the stopper. When this end section of the metal section is deformed, the stopper abutting section of the metal section is smoothed out and does not have burrs. In another embodiment, an area of the stopper abutting section is expanded by a deformation process. As a result, damages to the stopper members are substantially prevented.

In accordance with an embodiment of the present invention, a deformation is provided at a predetermined location along the metal section to shift the center of gravity of the mass member. Changes in the location of the center of gravity of the mass members change the key touch feeling of the corresponding keys. In preferred embodiments, an intermediate section or the stopper abutting section of the metal section is deformed to shift the center of gravity of the mass member along the length of the metal section. As a result, a keyboard apparatus with a different key touch feeling is provided with a small deformation in the mass concentration section of the metal section.

In accordance with an embodiment of the present invention, the length of the mass concentration section is changed with respect to each key or a group of keys to perform a keyboard scaling for changing or adjusting the key touch feeling of each of the keys or each group of the keys. For example, an elongated metal bar is cut into pieces defining metal sections having different lengths. Alternatively, an elongated metal bar is cut into pieces defining metal sections having the same length, and thereafter, one end of each of the cut metal pieces may be compressed (or extended) to change the length of each of the metal sections for each of the keys or each group of the keys.

In accordance with an embodiment of the present invention, a keyboard apparatus has a plurality of keys and a plurality of mass members. The mass concentration section of the mass members are formed by a press process, a header process, a bending process, a rolling process, or a combination of two of more of these processes. The degree of deformation in the mass concentration section is varied with respect to each of the keys or each group of the keys to perform keyboard scaling for each of the keys or each group of the keys. The mass concentration sections for all of the keys or groups of the keys may have the same length or different lengths, and the centers of gravity of the mass members are changed in the length-wise direction of the mass concentration sections by one or more of the above-described processes to perform keyboard scaling. In an alternative embodiment, the mass concentration sections have deformations provided by one or more of the above-described metal processes in which the deformations start at a specified constant location from the fulcrum receiving section of the mass member and end at different locations along the mass concentration sections. In another embodiment, the free end of each of the mass concentration sections is bent, and the degree of bend in each of the mass concentration sections or each group of the mass concentration sections is changed to perform keyboard scaling. In addition, the mass concentration sections are bent at different locations to perform keyboard scaling. Alternatively, keyboard scaling may be performed only by bending the mass concentration sections at different locations.

In accordance with an embodiment of the present invention, a method of making a mass member includes the steps of preparing a metal bar by a process which does not require a post-process, such as deburring, grinding and the like, cutting the metal into pieces each having a specified length, and forming a resin section including portions which are difficult to form in a metal material. For example, a fulcrum receiving section of the mass member has a relatively complicated shape and thus is difficult to form by a metal material. In accordance with an embodiment of the present invention, the fulcrum receiving section of the mass member is integrally formed in the resin section. Then, the metal bar and the resin section are coupled together by using a resin outsert forming process. As a result, the following effects will be achieved. ① The cost of a mass member and thus the overall cost of a keyboard apparatus are substantially reduced. ② Complicated structural parts in a mass member can be readily formed. ③ The weight of a mass member (a keyboard apparatus) is reduced. ④ When the weight of the entire mass member can be reduced, the center of gravity can be placed farther from the center of rotation of the mass member, and thus provide a good key touch feeling (a weighty key touch feeling). ⑤ Portions in a metal section that generate burrs can be substantially reduced. Accordingly, a post-process for deburring can be eliminated, and thus the manufacturing process is simplified. ⑥ Even if burrs are generated, the amount of burrs is very small, and therefore the generation of cracks in a resin covering the burrs can be substantially prevented.

In accordance with an embodiment of the present invention, a metal bar supporting section of a resin section is formed by an outsert forming method, and thin wall sections are formed in the metal bar supporting section. The thin wall sections are provided along the length of a metal bar embedding section of a metal section at specified positions. Alternatively, at least a portion of the periphery of the metal bar supporting section of the resin section has a thin wall. By providing a thin wall section, generation of cracks is limited within the thin wall section when a difference in stress between the metal bar and the resin section is generated due to thermal variations or external forces applied during and after manufacture. Locations of thin wall sections are designed so that the cracks are generated only in the designated locations where the function of the mass member is not affected, and where spreading of cracks is prevented. As a result, even if a deforming force or the like is applied to the resin section and the metal section during commercial distribution, cracks may only be generated in the thin wall sections, and not in other areas of the resin section. Therefore, a mass member in accordance with an embodiment of the present invention has a structure which does not affect the yield if the mass members are shipped as replacement parts in a commercial distribution system.

In accordance with an embodiment of the present invention, a metal bar is embedded in a metal bar supporting section of a resin section, and thin wall portions are formed adjacent the end of the metal bar embedded in the resin where burrs and bends may likely be formed. As a result, since cracks may be generated only in the thin wall portions adjacent the end of the metal bar, generation of cracks in the resin as a whole is effectively prevented. In accordance with the present invention, the post-process for deburring is eliminated and the deteriorative effects of the burrs can be substantially eliminated.

Other features and advantages of the invention will be apparent from the following detailed description, taken in conjunction with the accompanying drawings which illustrate, by way of example, various features of embodiments of the invention

BRIEF DESCRIPTION OF THE DRAWINGS

A detailed description of embodiments of the invention will be made with reference to the accompanying drawings.

DETAILED DESCRIPTION OF EMBODIMENTS

Figure 1:
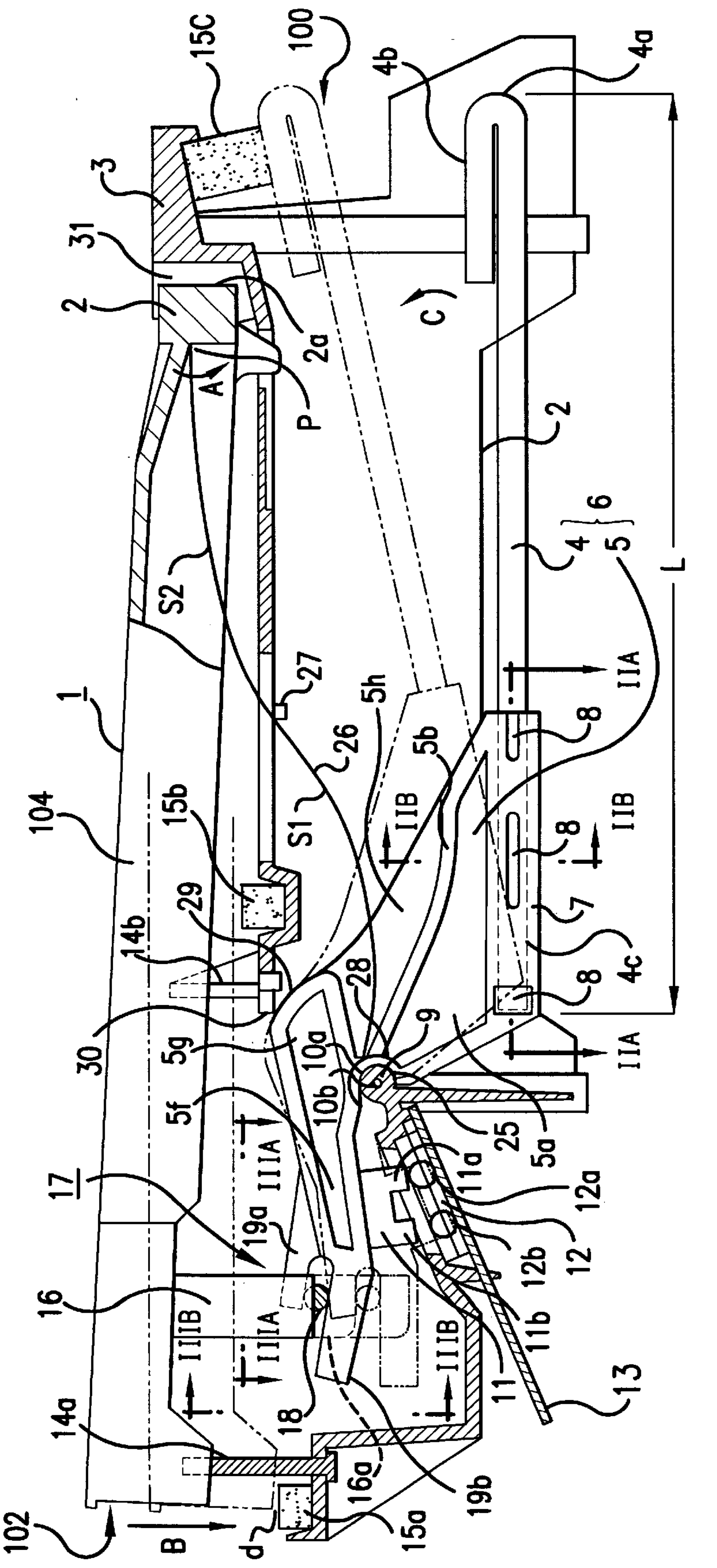
FIG. 1 shows a cross-sectional view of a keyboard apparatus having a mass member in accordance with an embodiment of the present invention.
Figure 2A:
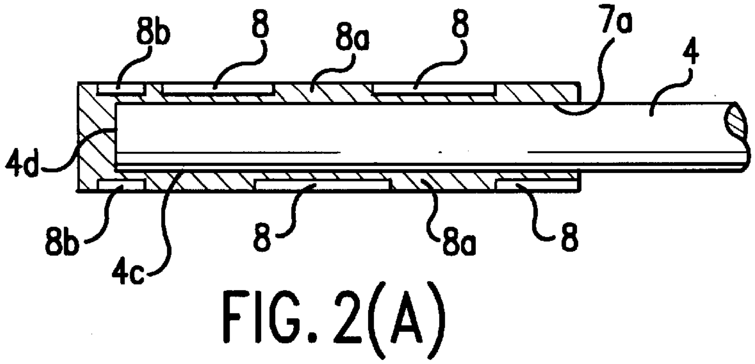
FIGS. 2 (A) and (B) show a cross-sectional view taken along lines IIA—IIA in FIG. 1 and a cross-sectional view taken along lines IIB—IIB in FIG. 1, respectively.
Figure 2B:
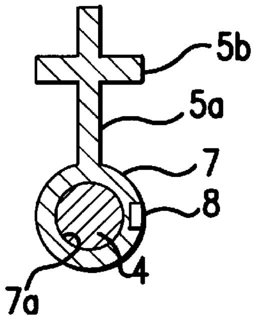
Figure 3A:
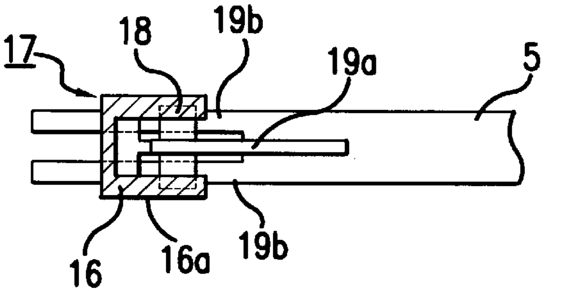
FIGS. 3 (A) and 3(B) show a cross-sectional view taken along lines IIIA—IIIA in FIG. 1 and a cross-sectional view taken along lines IIIB—IIIB in FIG. 1, respectively.
Figure 3B:
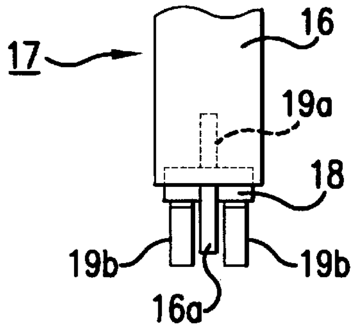
Figure 4A:
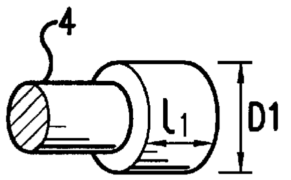
FIGS. 4(A)–4(E) show metal sections for a mass member having different shapes of deformation in accordance with embodiments of the present invention.
Figure 4B:
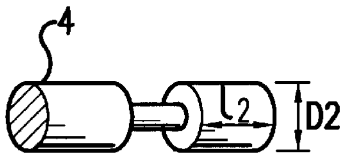
Figure 4C:
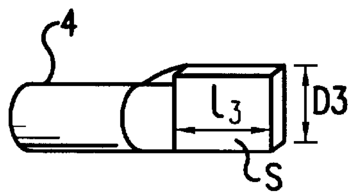
Figure 4D:
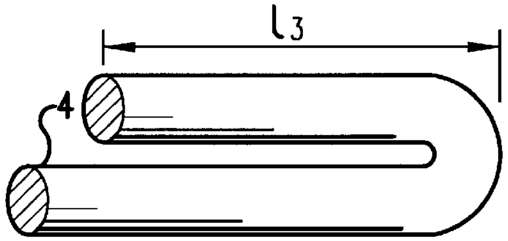
Figure 4E:
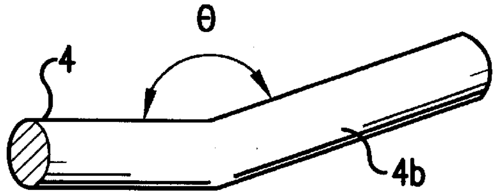
Figure 5:
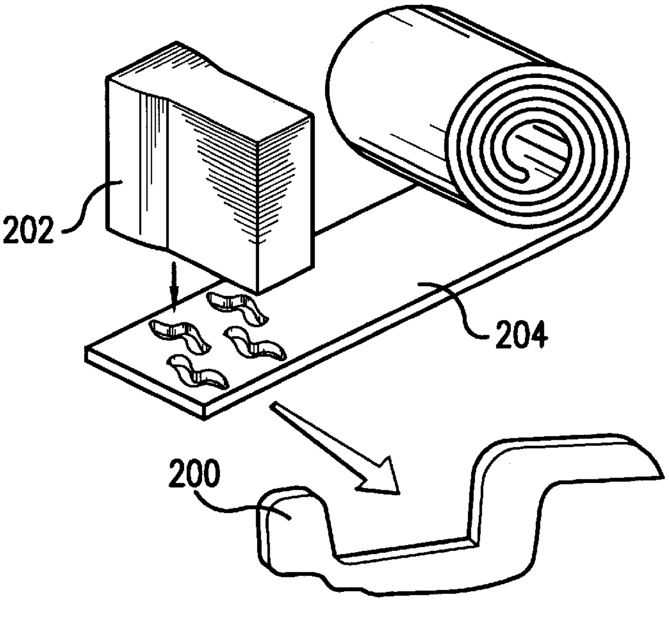
FIG. 5 PRIOR ART
FIG. 5 schematically shows a prior art punching process in which metal sections for mass members are punched out from a sheet of metal.

The present invention will be described with reference to the accompanying drawings. FIG. 1 shows a cross-sectional view of a white key assembly of a keyboard apparatus in accordance with an embodiment of the present invention. FIGS. 2 (A) and 2(B) show a cross-sectional view taken along lines IIA—IIA in FIG. 1 and a cross-sectional view taken along lines IIB—IIB in FIG. 1, respectively. FIGS. 3 (A) and 3(B) show a cross-sectional view taken along lines IIIA—IIIA in FIG. 1 and a cross-sectional view taken along lines IIIB—IIIB in FIG. 1, respectively.

A white key 1 has a pivot fulcrum section 2 formed adjacent a rear end section 2*a* of the white key 1. The white key 1 is mounted on a support member 3 so that the white key 1 is movable with respect to the support member 3. In the illustrated embodiment, the pivot fulcrum section 2 of the white key 1 is supported at a fulcrum section 31 of the support member 3 in a manner that the white key 1 is movable about the pivot fulcrum section 2 with respect to the support member 3.

A mass member 6 is disposed below the white key 1 and moves in association with movements of the white key 1. The mass member 6 generally includes a mass concentration section 4 and a resin section 5 integrally connected to the mass concentration section 4. It is noted that a mass member for a black key (not shown) has a similar structure as that of the mass member 6. Therefore, description for the mass member for the black key is omitted.

As described later in detail, in accordance with an embodiment of the present invention, the mass concentration section 4 is formed from a metal bar. In accordance with a preferred embodiment of the present invention, the metal bar is made of an iron steel, or any one of appropriate metal materials, and is made by a drawing process. In other words, the metal bar has substantially the same cross-sectional area along its longitudinal axis as a result of the drawing process. The metal bar is cut into pieces, each having a predetermined length to define the mass concentration section 4. For an ordinary keyboard apparatus, the length L of the metal concentration section 4 (see FIG. 1) is generally about 20 cm or less. However, it is noted that the length L may be longer than 20 cm depending on types and sizes of particular keyboard apparatuses. In the illustrated embodiment, the mass concentration section 4 has a rear end section 4*a* extending toward a rear side 100 of the keyboard apparatus, and is folded to define a folded section 4*b* as shown in FIG. 1. By folding the rear end section 4*a*, the weight of the rear end section 4*a* of the mass concentration section 4 can be increased. In the illustrated embodiment, the center of gravity of the mass concentration section 4 shifts toward the rear end section 4*a* of the mass concentration section 4 due to the folded section 4*b*. As a result, the rotational moment of the mass member 6 that is generated upon depression of the white key 1 increases, and an improved, heavier key touch feeling is generated as described later in detail.

The resin section 5 is fixed to a front base section 4*c* of the mass concentration section 4. The resin section 5 generally includes a front section 5*f*, an intermediate section 5*g* and a rear section 5*h* that are integrally formed together with a resin, such as for example, a polyacetal resin. In the illustrated embodiment, the front section 5*f* of the resin section 5 is coupled to the white key 1 and the rear section 5*h* is coupled to the mass concentration section 4. The resin section 5 includes a wall section 5*a* (see FIG. 2 (B)), and a reinforcement rib 5*b* provided in the wall section 5*a*.

The resin section 5 may be connected to the mass concentration section 4 by any one of appropriate methods, such as, for example, resin outserting, pressurecoupling, gluing and the like. In the illustrated embodiment, the resin section 5 is outserted over the front base section 4*c* of the mass concentration section 4 into a piece. In one embodiment, the resin section 5 has a metal bar holding section 7 that is outserted over the front base section 4*c* of the mass concentration section 4. In alternative embodiments, a bore 7*a* is provided in the metal bar holding section 7 by an appropriate method, for example, drilling or molding, and the front base section 4*c* of the mass concentration section 4 is inserted in the bore 7*a* (see FIG. 2 (B)) for connecting the resin section 5 with the mass concentration section 4. In this case, the connection between the front base section 4*c* of the mass concentration section 4 and the bore 7*a* of the metal bar holding section 7 is achieved by, for example, pressure coupling, gluing or the like.

The metal bar supporting section 7 includes thin wall sections 8 and thick wall sections 8*a*. In accordance with an embodiment of the present invention, the thin wall sections 8 are provided on opposing sides of the mass concentration section 4 in a staggering fashion as shown in FIG. 2 (A). As described in the summary section above, a stress may be generated due to a difference in thermal expansion (contraction) coefficient between the resin in the resin section 5 and the metal of the mass concentration section 4. However, by the provision of the thin wall sections 8, the stress is concentrated in the thin wall sections 8, and the thick wall sections 8*a* have substantially reduced stress. As a result, generation of cracks in the thick wall sections 8*a* is substantially reduced. If cracks ever occur in the metal bar supporting section 7, the cracks would occur in the thin wall sections 8 of the metal bar supporting section 7, and the cracks are generally confined in the thin wall sections 8.

Other thin wall sections 8*b* are provided on opposing sides of the mass concentration section 4 adjacent an end 4*d* of the mass concentration section 4. Burrs are likely formed at the end 4*d* of the mass concentration section 4 when the metal bar is cut to make the mass concentration section 4, and thus stresses may be generated at the burrs at the end 4*d* of the mass concentration section 4. The stresses generated at the end 4*d* of the mass concentration section 4 are generally concentrated in the thin wall sections 8*b*.

By forming a series of the thin wall sections 8 and 8*b* along substantially the entire length of the metal bar holding section 7 in the length-wise direction of the mass concentration section 4, thermal stresses and stresses generated by mechanical forces or the like are concentrated in the thin wall sections 8 and 8*b* of the metal bar holding section 7. As a result, cracks, if any, are confined in designated areas, such as the thin wall sections 8 and 8*b*. As a consequence, the connection between the resin section 5 and the mass concentration section 4 is securely maintained.

The resin section 5 of the mass member 6 includes a pivot fulcrum receiving section 9 that pivotally engages a mass member fulcrum section 25 provided on the support member 3. In an embodiment, the pivot fulcrum receiving section 9 of the resin section 5 includes a protrusion 10*a* that is inserted in a recess 10*b* provided at the mass member fulcrum section 25. As a result, shifts of the mass member 6 in a key arrangement direction are substantially prevented and therefore rattles of the mass member 6 in the key arrangement direction are substantially eliminated.

A pressure spring 26 extends between the mass member 6 and the support member 2 and between the support member and the white key 1 for normally pressing the pivot fulcrum receiving section 9 against the mass member fulcrum section 25, and the pivot fulcrum section 2 against the fulcrum section 31, respectively.

The pressure spring 26 may be formed from, for example, an elongated belt-like leaf spring. One end of the pressure spring 26 abuts against a retaining section 28 provided at the back side of the fulcrum receiving section 9 of the mass member 6. An intermediate section of the pressure spring 26 engages a step section 27 of the support member 3 for pressing the fulcrum receiving section 9 against the mass member fulcrum section 25. The other end P of the pressure spring 26 pushes the support section 2 of the white key 1 against the fulcrum section 31.

The resin section 5 of the mass member 6 includes an actuator 11 formed in a piece. As the white key 1 is depressed, the actuator 11 depresses a touch response switch 12 mounted on a substrate 13 that is fixed to the underside of the support member 2 with bolts or the like (not shown). In a preferred embodiment, the touch response switch 12 includes pressure sections 11*a* and 11*b* that successively depress rubber cups 12*a* and 12*b* of the touch response switch 12. As a result, switch contacts (not shown) inside the rubber cups 12*a* and 12*b* are successively closed to provide a signal corresponding to a key depression speed.

The support member 3 includes key guides 14*a* and 14*b* provided below the white key 1 adjacent a leading end 102 of the white key 1 and adjacent a central section 104 of the white key 1, respectively. The support member 3 includes a lower limit stopper 15*a* that abuts against the white key 1 adjacent the leading end 102 of the white key 1, and a stopper 15*b* that abuts against the white key 1 when the white key 1 is depressed with an excessive key depression force. Furthermore, a stopper 15*c* is provided on the support member 3 adjacent the pivot fulcrum section 2 of the white key 1 in the rear side 100 of the keyboard apparatus. Upon depression of the white key 1 with an ordinary key depression force, the end section 4*a* of the mass concentration section 4 of the mass member 6 is moved in the direction shown by an arrow C shown in FIG. 1, and the folded section 4*b* of the mass concentration section 4 abuts against the stopper 15*c*, as shown in a dot and dash line in FIG. 1. When the end section 4*a* (the folded section 4*b* ) comes in contact with the stopper 15*c* at a key depression stroke lower limit position, there is still a space d between the stopper 15*a* and the leading end 102 of the white key 1. Namely, under an ordinary key depression force, only the stopper 15*c* functions to stop the movement of the mass member 6. The other stoppers 15*a* and 15*b* come in contact with the white key 1 only when the white key 1 is depressed with an excessive force greater than an ordinary key depression. When the white key 1 is depressed with an excessive force, the white key 1 pivots about the pivot supporting section 2 in the direction of an arrow A at the rear end of the white key 1, and the leading end 102 of the white key 1 moves in the direction of an arrow B. As a result, the lower edge of the white key 1 successively abuts against the stoppers 15*b* and 15*a*. Alternatively, the height of the stoppers 15*a* and 15*b* may be adjusted so that the white key 1 first comes in contact with the stopper 15*a* and then the stopper 15*b*. By providing the stoppers 15 at a plurality of locations, the force is distributed over the white key 1. As a result, the musical instrument is not readily damaged when excessive force is applied to the white key 1 or the musical instrument itself.

A coupling member 16 is provided at the lower surface of the key 1 at a position that is rearwardly receded from the leading end 102 of the white key 1. The coupling member 16 transmits a key depression force generated by the key depression operation from the white key 1 to the mass member 6, and also by a key releasing force from the mass member 6 to the white key 1. The coupling member 16 and the resin section 5 of the mass member 6 define a force transmission section 17. The force transmission section 17 is shown in detail in FIG. 3. The coupling member 16 has a protruding piece 16*a* in the shape of a letter L connected to the lower end of the coupling member 16 (see FIG. 1). The protruding piece 16*a* engages a lower portion of a connecting shaft 18. The connecting shaft 18 is preferably made of a flexible material. Alternatively, the connecting shaft 18 is formed from a relatively hard shaft and a flexible material wrapped around the hard shaft (not shown). The connecting shaft 18 is connected to the lower end portion of the coupling member 16 and is slidably held between an upper retaining member 19*a* and two lower retaining members 19*b* of the resin section 5 of the mass member 6. In the illustrated embodiment, the connecting shaft 18 is removable from the coupling member 16. The lower retaining members 19*b* are longer than the upper key retaining member 19*a* and function as key connecting guides to facilitate the connection of the white key 1 to the mass member 6. The mass member 6 is first inserted into the support member 2, the connecting shaft 18 of the connecting member 16 is guided along the lower retaining members 19*b* of the mass member 6. As a result, the connecting member 16 and the mass member 6 are connected through the flexible connecting shaft 18. By connecting the connecting member 16 and the mass member 6 through the flexible connecting shaft 18, an impact that may be generated upon depression of the white key 1 is absorbed. As a consequence, a smooth connection between the connecting member 16 and the mass member 6 is achieved, with high mutual responsiveness and without rattles, and thus a key depression force is correctly transferred. Furthermore, since the connecting shaft 18 of the connecting member 16 is slidably held between the upper retaining member 19*a* and the lower retaining members 19*b*, the force transmission section 17 transfers forces in both upward and downward direction. In other words, the connecting member 16 is linked to the mass member 6 in both upward and downward movements of the connecting member 16. Accordingly, even when the key 1 is rapidly depressed with a substantial force, the connecting member 16 remains linked to the mass member 6. As a result, unpleasant vibrations of the key 1 are substantially eliminated and the key touch feeling of the keyboard apparatus is improved.

In the illustrated embodiment, the resin section 5 of the mass member 6 has a rearwardly extending fall-out stop member 29 formed in a relatively rearward section of the resin section 5 adjacent the mass member fulcrum section 25. The fall-off stop member 29 abuts against an end section 30 provided in the key support member 3 to prevent the mass member 6 from falling off in the rearward direction (in the rightward direction in FIG. 1). When the mass member 6 is required to be removed from its position for repair or replacement, the mass member 6 is rotated in a clockwise direction and then pushed downward. The mass member 6 then is downwardly moved to disengage the fall-off stop member 29 from the end section 30 of the key support member 3.

In accordance with embodiments of the present invention, a variety of user-friendly elements described above, such as, for example, "low cost", "light weight", "reduced burrs", "good key touch feeling", and "easy keyboard scaling for key touch feeling", are achieved. In other words, a variety of technically contradicting problems in connection with the design of a keyboard apparatus have been substantially solved.

First, as described above, the more the center of gravity of a mass member is shifted from its pivot fulcrum toward a free end of the mass member, the lighter the mass member can be made if the same rotational moment is maintained. In this respect, the rear end section 4*a* of the mass concentration section 4 is folded to form the folded section 4*b*, as shown in FIG. 1.

Figure 6A:
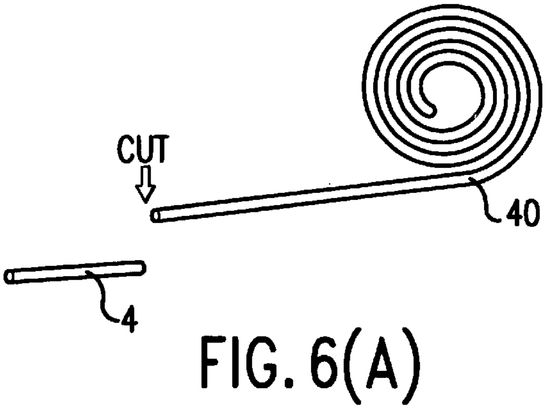
FIGS. 6 (A) and (B) schematically show a mass member manufacturing process in accordance with an embodiment of the present invention in which metal sections for mass members are formed from a bar of metal.
Figure 6B:
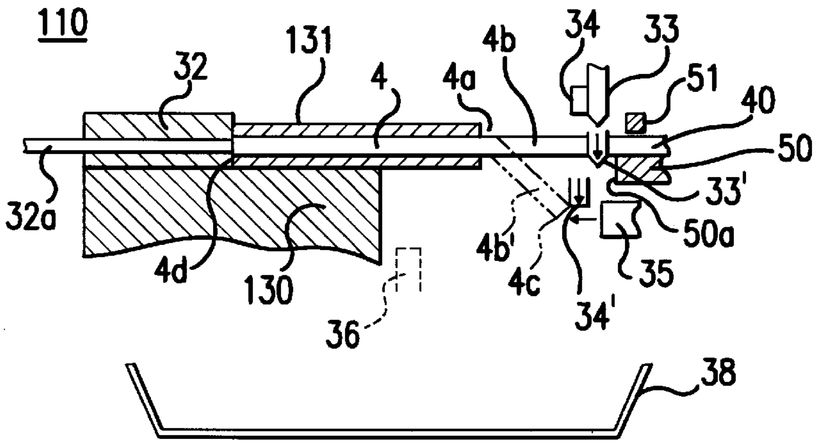

A variety of methods can be used to from the mass concentration section 4 of the mass member 6. In accordance with an embodiment of the present invention, a metal bar member 40 is made by a drawing method, and may be wound into a coil as shown in FIG. 6 (A). The metal bar member 40 may be made of any one of appropriate metal materials or alloys, such as, for example, iron, stainless steel, and the like. As shown in FIG. 6 (B), one end of the straight metal bar member 40 is led into a metal bar cutting and bending apparatus 110. The metal bar cutting and bending apparatus 110 includes a work table 50 and a guide 51 for guiding the metal bar member 40 on the work table 50. The metal bar cutting and bending apparatus 110 also includes a table 130 that is movable in a lengthwise direction of the metal bar member 40 and a guide and pipe fixing member 131 fixed on the table 130. A stopper 32 is also fixed on the table 130 next to the guide and pipe fixing member 130. In a first step, the leading end of the metal bar member 40, that has passed the work table 50, is then guided by the guide and pipe fixing member 131 and is abutted against the stopper 32. In a second step, the metal bar member 40 is cut by a cutter blade 33 of the metal bar cutting and bending apparatus 110 as shown by an arrow in FIG. 6 (B) just below the cutter blade 33. The cutter blade 33 moves in association with a push member 34 disposed above and outside of an end face 50*a* of the table 50. In a third step, after the cutter blade 33 cuts off a metal bar 4 from the metal bar member 40, the push member 34 that moves in association with the cutter blade 33 pushes down a folding section 4*b* of the metal bar 4 and bends the folding section 4*b* about an end corner T of the guide and pipe fixing member 131 to a position 4*b*'. In a forth step, the push member 34 and the cutter blade 35 are raised to an original position. In a fifth step, a plunger 35 is moved from a stand-by position shown in FIG. 6 (B) to further push the folding section 4*b* to the left into a completely folded state as shown in FIG. 1. Alternatively, if it is difficult to bend the folding section 4*b* into the completely folded state, an auxiliary plunger 36 may be used for further upward bending. In a sixth step, when the bending work is completed, a leading end 4*d* of the metal bar 4 (that defines the mass concentration section 4) is pushed to the right by a plunger rod 32*a* that is slidable through the stopper 32. Concurrently with the motion of the plunger rod 32*a*, the table 130 is moved to the left. In a seventh step, the metal bar 4 is released from the guide and pipe fixing member 131 and drops into a receiving container 38 that is positioned below the pipe member 131.

Most of the moving components required for the above-described steps, such as, the table 130, the cutter blade 33, the plunger rod 32*a*, the plunger 35 and the like, are automatically controlled by a computer or a relay sequence control. However, these components may also be manually controlled.

Let us take a look at generation of burrs in the metal bar 4 during the above described steps. If burrs are ever generated, they occur at a lower cut edge 4*c* of the metal bar 4. Burrs at the lower cut edge 4*c* come inside as the folded section 4*b* is completely bent (at 180 degrees), therefore the burrs generated at the lower cut edge 4*c* do not come in contact with other sections of the keyboard apparatus, for example, the stopper 15*c*. The other end 4*d* is embedded in the resin section 5, and accordingly burrs at the other end 4*d* are embedded in the resin section 5. Since burrs may be present in contact with the resin in a very small area at a corner of the end 4*d*, stress that may be generated at the burrs is substantially small, and therefore generation of cracks due to the stress is substantially reduced and is generally confined in this small area at the end 4*d* of the metal bar 4. In accordance with an embodiment of the present invention, the metal bar holding section 7 of the resin section 5 includes thin wall sections 8*b* at the end 4*d* of the metal bar 4 to effectively confine cracks in the thin wall sections 8*b* in order to substantially eliminate total destruction of the resin section 5 due to cracks.

As described above, the table 130 is moved when the bar member 4 is removed from the guide and pipe fixing member 131. In this connection, the movement of the table 130 may be used to change the length of the folded section 4*b* of the metal bar 4. For example, the table 130 may be stopped at different locations to change the length of the folded section 4*b* of the metal bar 4. In accordance with an embodiment, the table 130 is moved to the left (or to the right), from a location shown in FIG. 6 (B), and then the cutting and bending works are performed. As a result, the metal bar (mass concentration section) 4 having the same nominal length L with a longer (or shorter) folded section 4*b* is created (see FIGS. 1 and 4 (D)). By using this cutting and bending method, a keyboard apparatus with individual keys or groups of keys having different counter forces is achieved. In other words, keyboard scaling is performed to change the key touch feeling of individual keys or groups of keys. Also, since the weight of the mass member 6 is concentrated adjacent the end section 4*a* of the mass member 6, a lighter and better key touch feeling, that is much closer to the key touch feeling provided by an acoustic grand piano, is obtained, compared with a conventional mass member having its weight generally evenly distributed along the mass member or centered about its center of rotation.

The metal concentration sections 4 can also be made by a variety of other methods. Some of the methods for creating the metal concentration sections 4 will be described below with reference to FIGS. 4 (A) through 4 (E).

FIG. 4 (A) shows a main portion of the mass concentration section 4 in which a header process is performed after cutting the metal bar 4. More particularly, after cutting the metal bar 4, the table 130 is moved to the left, and the right end of the cut metal bar 4 is hit by a mass member having a specified head shaped recess. For the convenience of explanation of the header process, see FIG. 6 (C). However, the header work is better performed, from the view point of dynamics, if a header apparatus (not shown) is vertically aligned with the cutting and bending apparatus 110. For example, the cutting and bending apparatus 110 is turned 90 degrees so that the righthand side of the cutting and bending apparatus 110 shown in FIG. 6 (C) is positioned at a top, and the left-hand side of the cutting and bending apparatus 110 is positioned at a bottom. The header apparatus is placed over the cutting and bending apparatus 110 to hit the metal bar 4 from the top.

FIG. 4 (B) shows a main portion of the metal bar (mass concentration section) 4 in accordance with an embodiment. After cutting off the metal bar 4, one end of the metal bar 4 is roll pressed to provide an irregular weight distribution in the mass concentration section 4.

FIG. 4 (C) shows a main portion of the metal bar (mass concentration section) 4 in accordance with an embodiment. After cutting off the metal bar 4, one end of the metal bar 4 is pressed to provide an irregular weight distribution in the mass concentration section 4. In this embodiment, a wide area section S is positioned to abut the stopper 15*c*.

By performing the processes described above with reference to FIGS. 4 (A)–(C), the same weight shifting effects that are obtained by the process described with reference to FIGS. 1 and 4 (D) are obtained. However, burrs (at least at the end section 4*c* of the metal bar 4) are treated in a different manner by the processes described with reference to FIGS. 4 (A)–(C) than the process described with reference to FIGS. 1 and 4(D). In the process shown in FIG. 4 (D), burrs are left without being removed. In contrast, in the processes shown in FIGS. 4 (A)–(C), the mass concentration sections 4 are processed by rolling or pressing processes, and burrs that may be present in the mass concentration sections 4 are eliminated during these processes.

In a preferred embodiment, for example, dimensions $l_1$ and $D_1$, of the metal bar 4 shown in FIG. 4 (A) are varied to perform a keyboard scaling for adjusting or changing the key touch feeling for each of the keys or each group of the keys. Dimensions $l_2$ and $D_2$ of the metal bar 4 shown in FIG. 4 (B) and dimensions $l_3$ and $D_3$ of the metal bar 4 shown in FIG. 4 (C) may be varied in a similar manner to perform a keyboard scaling for adjusting or changing the key touch feeling for each of the keys or each group of the keys.

FIG. 4 (E) shows a metal bar 4 in which an end section 4*b* of the metal bar (mass concentration section) is bent at an angle θ. The angle θ may be varied for each of the keys or a group of the keys to provide a keyboard scaling for adjusting or changing the key touch feeling.

In accordance with the embodiment shown in FIG. 1, a key stopper is not provided to directly stop the white key 1 upon depression of the white key 1. Instead, the mass member stopper 15*c* is provided not only to stop the mass member 6 but also to serve to stop the white key 1 upon depression of the white key 1. As a result, a good key stop feeling is achieved. The good key stop feeling further improves the improved key touch feeling of the keyboard apparatus.

As described above, by the use of elongated metal bars, wastes of materials are substantially eliminated and thus the material cost for the mass members is substantially reduced.

In an embodiment of the present invention, a mass member for a keyboard apparatus is formed from a metal bar section having a predetermined length and a resin section integrally connected to the metal bar section. Substantial portions of the mass member that are difficult to form by a metal material are formed from a resin. For example, the resin section of a mass member includes a fulcrum section, a pressure spring retaining section at the fulcrum section, a force transmission section, a switch actuator section, guide sections for coupling a key to the mass member, and a fall-off prevention section for preventing the mass member from falling off from a support member of the keyboard apparatus. These sections of the resin section of the mass member would be difficult to form with a metal material, such as, for example, iron or steel used in a conventional keyboard apparatus because of their relatively complicated configurations. As a result, manufacture of a mass member having sections of complicated configurations is substantially facilitated, and the weight of the mass member is reduced.

In accordance with an embodiment of the present invention, a mass concentration section of a mass member is made by a metal bar that is made by a rolling process or a drawing process. As a result, the amount of burrs in the mass member is substantially reduced, and thus the burr removing process to remove burrs from the mass member is substantially eliminated.

In accordance with an embodiment of the present invention, the resin section is connected to the mass concentration section by embedding one of the end sections of the mass concentration section in a part of the resin section. As the mass concentration section is made from a cut metal bar, the cut metal bar may have burrs at the end section that is covered by the resin. Since the generated burrs are limited to a very small area at the end section of the metal bar, generation of cracks caused by the burrs is confined in that small area, and generation of cracks in other areas of the resin section, particularly in those areas that cover the mass concentration section, is substantially eliminated. As a result, the mass member has an improved mechanical strength, reduced clatters and reduced noise due to the clatters.

In accordance with an embodiment of the present invention, a portion of the mass concentration section is deformed by one of several deformation processes, such as, for example, a header process, a rolling press process, a press process and the like. As a result, burrs on the mass concentration section are eliminated and the processed portion has a smoother surface. Therefore, when the processed portion is connected to the resin section, generation of cracks is substantially reduced. When the processed portion is positioned to abut against a stopper for stopping the mass member, damage to the stopper is substantially reduced. Furthermore, when the mass concentration section is deformed at an appropriate location, such as, for example, at an intermediate section or an end section opposite to the section that is connected to the resin section, by any one of the processes described above, the center of gravity of the mass member can be shifted to a desired position. Moreover, with a small deformation provided to mass concentration sections, a keyboard apparatus with a different key touch feeling is provided.

In accordance with an embodiment of the present invention, the length of mass concentration sections is changed with respect to individual keys or groups of keys to perform keyboard scaling for adjusting or changing the key touch feeling for each of the individual keys or each group of the keys. For example, the length of the mass concentration section can be changed by changing the length of the metal bar when the metal bar is cut. Alternatively, mass concentration sections may have the same length when they are cut in a cutting operation, and one end of each of the mass concentration sections may be compressed (or extended) after the cutting operation to change the length or the weight distribution of each of the mass concentration sections.

In accordance with an embodiment of the present invention, a mass member has a resin section and a metal bar section (a mass concentration section). The resin section has a metal bar supporting section that is outserted over one end section of the metal bar. In a preferred embodiment, thin wall sections are formed in the metal bar supporting section. When a stress difference is generated between the metal bar and the resin section due to thermal variations or external forces applied during and after the manufacture of the mass member, cracks may be generated in the resin section. However, the generation of such cracks is substantially confined within the thin wall sections and does not spread into other areas. Accordingly, the resin section is designed so that cracks may be generated only in a designated area where the function of the mass member is not affected by the cracks, and the spreading of cracks is prevented.

In accordance with an embodiment of the present invention, thin wall sections are formed at an end of the metal bar which is embedded in the resin section. Cracks may be generated by burrs that may be present at the end of the metal bar or by a bending force applied to the mass member. However, such cracks are substantially confined within the thin wall sections provided at the end of the metal bar and do not spread into other areas of the resin section.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A keyboard apparatus for an electronic musical instrument comprising:

a support member including a first fulcrum section and a second fulcrum section;

at least one key movably supported about the first fulcrum section of the support member; and a mass member movably supported on the support member and coupled to the at least one key, the mass member having a mass concentration section made of an elongated metal bar and a resin section connected to the mass concentration section, wherein the resin section of the mass member includes a forward section and a rearward section, wherein the forward section of the resin section is free of contact with the elongated metal bar of the mass concentration section, and has a pivotal fulcrum receiving section to be pivotally supported about the second fulcrum of the support member, and the rearward section, which is integrally formed with the forward section, is connected to the mass concentration section.

2. The keyboard apparatus for an electronic musical instrument as defined in claim 1, wherein the mass concentration section of the mass member is formed from one of a rolled metal bar and a drawn metal bar.

3. The keyboard apparatus for an electronic musical instrument as defined in claim 1, wherein the rearward section of the resin section has a bar holding section that is outserted on an exterior surface of the mass concentration section.

4. The keyboard apparatus for an electronic musical instrument as defined in claim 1, wherein the resin section and the mass concentration section of the mass member are connected together by pressure-coupling the resin section and the mass concentration section together.

5. The keyboard apparatus for an electronic musical instrument as defined in claim 1, wherein the resin section and the mass concentration section of the mass member are connected together by gluing the resin section and the mass concentration section together.

6. The keyboard apparatus for an electronic musical instrument as defined in claim 1, wherein the mass concentration section of the mass member has a weight portion that is formed by deforming a portion of the mass concentration section by one of a header process, a bending process, a rolling process, and a press process.

7. A keyboard apparatus for an electronic musical instrument comprising:

a support member including a first fulcrum section and a second fulcrum section;

at least one key movably supported about the first fulcrum section of the support member; and a mass member movably supported on the support member and coupled to the at least one key, the mass member having a mass concentration section made of an elongated metal bar and a resin section connected to the mass concentration section, the resin section having a pivotal fulcrum receiving section to be pivotally supported about the second fulcrum of the support member, wherein the resin section has a bar holding section defining a bore and the mass concentration section has an embedded end section that is inserted in the bore of the bar holding section of the resin section for connecting the resin section and the mass concentration section together.

8. A keyboard apparatus for an electronic musical instrument comprising:

a support member including a first fulcrum section and a second fulcrum section;

at least one key movably supported about the first fulcrum section of the support member; and a mass member movably supported on the support member and coupled to the at least one key, the mass member having a mass concentration section made of an elongated metal bar and a resin section connected to the mass concentration section, the resin section having a pivotal fulcrum receiving section to be pivotally supported about the second fulcrum of the support member, wherein the resin section has a bar holding section defining a bore and the mass concentration section has an embedded end section that is inserted in the bore of the bar holding section of the resin section for connecting the resin section and the mass concentration section together.

9. A keyboard apparatus for an electronic musical instrument comprising:

a support member including a plurality of first fulcrums and a plurality of second fulcrums;

a plurality of keys, each being movably supported at one of the corresponding first fulcrums of the support member; and a plurality of mass members coupled to the corresponding plurality of keys, each of the mass members being movably supported on the support member, wherein the mass members have mass concentration sections and resin sections connected to the mass concentration sections, each of the mass concentration sections is made of an elongated metal material, and each of the resin sections has integrally formed a forward section and a rearward section, the rearward section being connected to one of the mass concentration sections, and the forward section being free of contact with the mass concentration section and having a pivotal fulcrum receiving section to be pivotally supported at one of the second fulcrums of the support member.

10. A keyboard apparatus for an electronic musical instrument comprising:

a support member including a plurality of first fulcrums and a plurality of second fulcrums;

a plurality of keys, each being movably supported at each of the corresponding first fulcrums of the support member; and a plurality of mass members coupled to the corresponding plurality of keys, each of the keys being movably supported on the support member, wherein the mass members have mass concentration sections, each of the mass concentration sections being made of an elongated metal material, and resin sections connected to the respective mass concentration sections, each of the resin sections having a pivotal fulcrum receiving section to be supported at the second fulcrum of the support member, and each of the mass concentration sections has a different length from one another with respect to each of the plurality of keys.

11. A keyboard apparatus for an electronic musical instrument comprising:

a support member including a plurality of first fulcrums and a plurality of second fulcrums;

a plurality of keys, each being movably supported at each of the corresponding first fulcrums of the support member; and a plurality of mass members coupled to the corresponding plurality of keys, each of the keys being movably supported on the support member, wherein the mass members have mass concentration sections, each of the mass concentration sections being made of an elongated metal material, and resin sections connected to the respective mass concentration sections, each of the resin sections having a pivotal fulcrum receiving section to be supported at the second fulcrum of the support member, and the plurality of keys and the corresponding plurality of mass concentration sections are divided into a plurality of groups, each group of the mass concentration sections having a different length from one another with respect to each group of the plurality of keys.

12. A mass member to be coupled to a key in a keyboard apparatus of an electronic musical instrument, the mass member comprising:

an elongated mass concentration member made of an elongated metal member, the mass concentration member including an embedded section; and a resin section formed from a resin, the resin section including a forward section and a support section, the support section being connected with the embedded section of the mass concentration member in order to connect the resin section and the mass concentration member together, wherein the forward section is free of contact with the mass concentration member, wherein the forward section has a pivotal fulcrum receiving section to be pivotally supported about a fulcrum, and the support section of the resin section has a wall section of a specified thickness capable of supporting the entire mass concentration member and at least one thin wall section thinner than the predetermined thickness formed in the wall section.

13. The mass member as defined in claim 12, wherein the support section of the resin section has a plurality of thin wall sections thinner than the predetermined thickness formed along a longitudinal axial direction of the mass concentration member, the thin wall sections being positioned at different locations across the entire length of the embedded section.

14. The mass member as defined in claim 12, wherein the support section of the resin section is outserted on the embedded section of the mass concentration member.

15. The mass member as defined in claim 12, wherein the embedded section of the mass concentration member is pressure connected to the support section of the resin section.

16. The mass member as defined in claim 12, wherein the support section of the resin section is glued to the embedded section of the mass concentration member.

17. A mass member to be coupled to a key in a keyboard apparatus of an electronic musical instrument, the mass member comprising;

an elongated mass concentration member made of an elongated metal member, the mass concentration member including an embedded section; and a resin section formed from a resin, the resin section including a support section for connection with the embedded section of the mass concentration member to connect the resin section and the mass concentration member together, wherein the support section of the resin section has a wall section of a specified thickness capable of supporting the entire mass concentration member and at least one thin wall section thinner than the predetermined thickness formed in the wall section, and the at least one thin wall section is provided in the support section at an end of the embedded section of the mass concentration member.

18. A mass member to be coupled to a key in a keyboard apparatus of an electronic musical instrument, the mass member comprising:

an elongated mass concentration member made of an elongated metal member, the mass concentration member including an embedded section; and a resin section formed from a resin, the resin section including a forward section and a support section, only the support section being connected with the embedded section of the mass concentration member in order to connect the resin section and the mass concentration member together, wherein the forward section has a pivotal fulcrum receiving section to be pivotally supported about a fulcrum, the support section of the resin section has a wall section of a specified thickness capable of supporting the entire mass concentration member and at least one thin wall section thinner than the predetermined thickness formed in the wall section, wherein the embedded section of the mass concentration member is pressure connected to the support section of the resin section, and the support section of the resin section defines a bore and the embedded section is inserted in the bore of the support section of the resin section for connecting the resin section and the mass concentration member together.

19. A mass member to be coupled to a key in a keyboard apparatus of an electronic musical instrument, the mass member comprising:

an elongated mass concentration member made of an elongated metal member, the mass concentration member including an embedded section; and a resin section formed from a resin, the resin section including a forward section and a support section, only the support section being connected with the embedded section of the mass concentration member in order to connect the resin section and the mass concentration member together, wherein the forward section has a pivotal fulcrum receiving section to be pivotally supported about a fulcrum, the support section of the resin section has a wall section of a specified thickness capable of supporting the entire mass concentration member and at least one thin wall section thinner than the predetermined thickness formed in the wall section, wherein the support section of the resin section is glued to the embedded section of the mass concentration member, and the support section of the resin section defines a bore and the embedded section is inserted in the bore of the support section of the resin section for connecting the resin section and the mass concentration member together.

20. A keyboard apparatus for an electronic musical instrument comprising:

a support member including at least a first fulcrum and at least a second fulcrum;

at least a key being pivotally supported about the first fulcrum of the support member and having a connecting member; and at least a mass member coupled to the connecting member of the key, the mass member including a forward section, an intermediate section spaced a specified distance from the forward section and pivotally supported about the second fulcrum of the support member, and a rearward section containing a mass concentration member, wherein the forward section is free of contact with the mass concentration member, wherein the forward section of the mass member includes a coupling section for engaging the connecting member of the key for coupling the key and the mass member together in both upward direction and downward direction.

21. The keyboard apparatus as defined in claim 20, further comprising a flexible material section disposed between the connecting member of the key and the coupling section of the forward section of the mass member.

22. A keyboard apparatus for an electronic musical instrument comprising:

a support member including at least a first fulcrum and at least a second fulcrum;

at least a key being pivotally supported about the first fulcrum of the support member and having a connecting member; and at least a mass member coupled to the connecting member of the key, the mass member including a forward section and an intermediate section spaced a specified distance from the forward section and pivotally supported about the second fulcrum of the support member, the forward section including a coupling section engaging the connecting member of the key for coupling the key and the mass member together in both upward direction and downward direction, wherein the coupling section of the forward section includes an upper retaining member and two lower retaining members longer than the upper retaining member, the connecting member of the key includes a pin slidably engaging between the upper retaining member and the two lower retaining members of the coupling section of the forward section.

23. The keyboard apparatus as defined in claim 22, wherein the pin includes a flexible material section for engagement with the upper retaining member and the two lower retaining members of the coupling section of the forward section.

24. A keyboard apparatus including a mass member to be actuated by a key, the mass member comprising:

a single metal bar defining a mass concentration section; and a resin force transmission section that is coupled to the key, wherein the mass concentration section is connected to the resin force transmission section, and the resin force transmission section defines a forward section to be coupled to the key, an intermediate section integrally formed with the forward section, the intermediate section pivotally supported on a support member of the keyboard, and a rearward section integrally formed with the forward section and the intermediate section, the rearward section connected to the mass concentration section.

25. The keyboard apparatus as defined in claim 24, wherein the rearward section defines a connecting section formed over the mass concentration section to connect the mass concentration section to the resin force transmission section.

26. The keyboard apparatus as defined in claim 24, wherein the mass concentration section defines a front end section connected to the resin force transmission section and a rear end section opposite of the front end section, wherein the rear end section of the mass concentration section is folded to shift the center of gravity of the mass member toward the rear end section of the mass concentration section.

27. The keyboard apparatus as defined in claim 24, wherein the mass concentration section defines a front end section connected to the resin force transmission section and a rear end section opposite of the front end section, wherein the rear end section of the mass concentration section is bent at a specified angle to shift the center of gravity of the mass member toward the rear end section of the mass concentration section.

28. The keyboard apparatus as defined in claim 24, wherein the mass concentration defines a front end section connected to the resin force transmission section and a rear end section opposite of the front end section, wherein the rear end section of the mass concentration section has an enlarged section that is provided by deforming a part of the rear end section of the mass concentration section to shift the center of gravity of the mass member toward the rear end section of the mass concentration section.

29. The keyboard apparatus as defined in claim 24, wherein the single metal bar defines a longitudinal axis and has an equal cross-sectional shape along the longitudinal axis.

30. The keyboard apparatus as defined in claim 24, wherein the single metal bar defines a longitudinal axis and has an equal cross-sectional area along the longitudinal axis.

31. The keyboard apparatus as defined in claim 24, wherein the single metal bar is one of a rolled metal bar and a drawn metal bar.

32. The keyboard apparatus as defined in claim 24, wherein the single metal bar defines a longitudinal axis and has an equal cross-sectional shape along the longitudinal axis and is formed from one of a rolled metal bar and a drawn metal bar.

33. A mass member unit to be coupled to a key in a keyboard apparatus of an electronic musical instrument, the mass member unit comprising:

a single metal bar defining a mass concentration section; and a resin force transmission section having a forward section and a rearward section, wherein the rearward section is connected to the mass concentration section, wherein the forward section is free of contact with the mass concentration section, wherein the single metal bar defines a longitudinal axis and has an equal cross-sectional shape along the longitudinal axis.

34. The mass member as defined in claim 33, wherein the single metal bar is one of a rolled metal bar and a drawn metal bar.

35. The mass member unit as defined in claim 33, wherein one portion of the resin force transmission section is pivotally connected to a support member so that the center of gravity of the mass member unit is shifted closer to a free end of the mass member unit than the resin force transmission section.

36. A mass member unit to be coupled to a key in a keyboard apparatus of an electronic musical instrument, the mass member unit comprising:

a single metal bar defining a mass concentration section; and a resin force transmission section having a forward section and a rearward section, wherein the rearward section is connected to the mass concentration section, wherein the forward section is free of contact with the mass concentration section, wherein the single metal bar defines a longitudinal axis and has an equal cross-sectional area along the longitudinal axis.

37. The mass member as defined in claim 36, wherein the single metal bar is formed from one of a rolled metal bar and a drawn metal bar.

38. The mass member as defined in claim 36, wherein one portion of the resin force transmission section is pivotally connected to a support member so that the center of gravity of the mass member unit is shifted closer to a free end of the mass member unit than the resin force transmission section.

* * * * *